Oct. 22, 1957 L. D. ELAM 2,810,596
IDLER ARM MOUNT FOR STEERING LINKAGE
Filed March 5, 1954
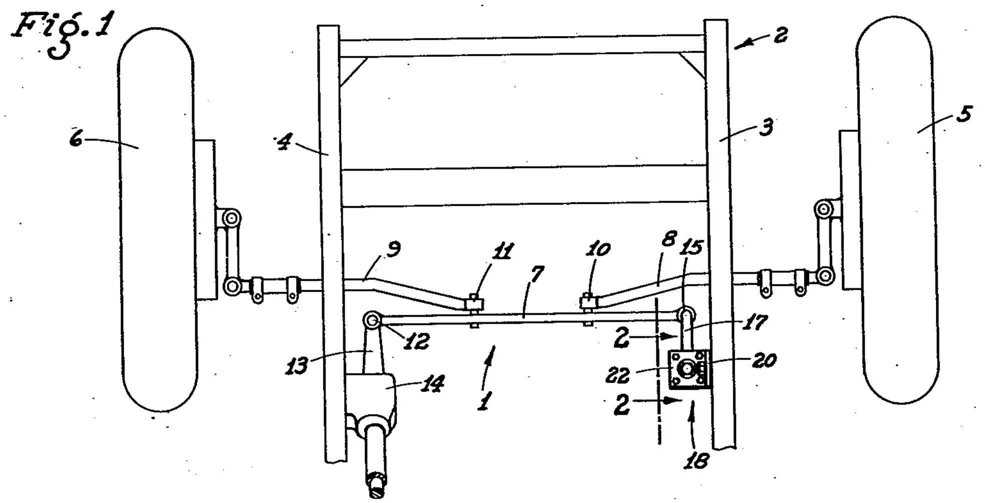
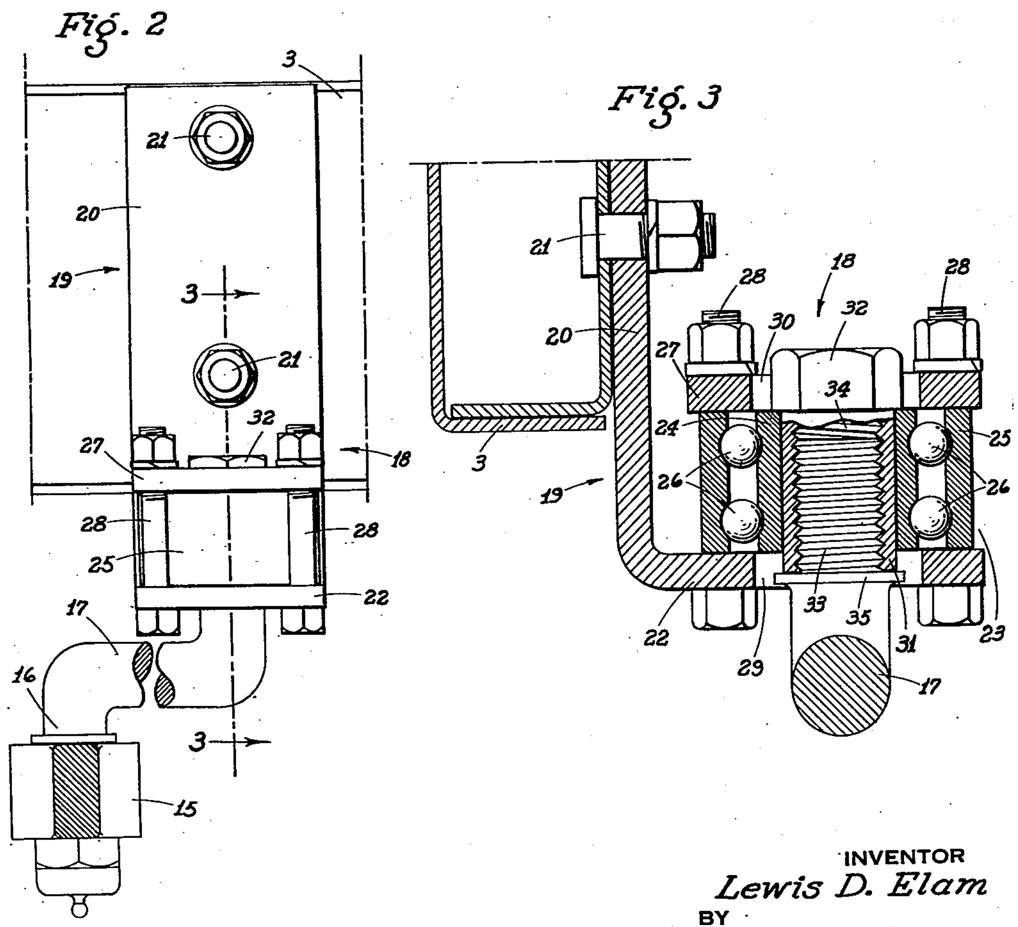
INVENTOR
Lewis D. Elam
BY
Webster & Webster
ATTYS United States Patent Office 2,810,596

Patented Oct. 22, 1957

2,810,596

IDLER ARM MOUNT FOR STEERING LINKAGE

Lewis D. Elam, Stockton, Calif., assignor, by direct and mesne assignments, of one-half to James M. Wehe, Stockton, Calif.

Application March 5, 1954, Serial No. 414,430

3 Claims. (Cl. 287—93)

This invention is directed to, and it is a major object to provide, an improved mount for the idler arm of steering linkage in an automotive vehicle.

In the steering installations of certain automotive vehicles a transversely extending steering arm is pivotally supported, at the end opposite the one connected to the radial lever of the steering column gear box, to a laterally swingable idler arm which extends generally parallel to such radial lever; the idler arm at the end remote from the steering arm being pivotally attached by a mount to an adjacent portion of the vehicle frame. The mount heretofore employed between the idler arm and said part of the vehicle frame was of such construction that loose-play soon developed between said mount and idler arm, and which loose-play—reflecting through the remainder of the steering linkage—permitted front wheel flutter and shimmy, which was objectionable not only from the standpoint of annoyance to the driver, and undue tire wear, but steering control was affected to an extent such that an element of danger existed.

It is therefore another important object of this invention to provide a mount, for the idler arm, which effectively stabilizes the latter, to the end that such undesirable loose-play is avoided, while permitting of the necessary free lateral swinging of said lateral arm with movement of the steering linkage.

An additional object of the present invention is to provide an idler arm mount which comprises a novel, bracket supported bushing and anti-friction bearing unit adapted for connection with the related end of the idler arm.

It is also an object of the invention to provide an idler arm mount which is of simple but rugged construction; being designed for ease and economy of manufacture and installation, either as a part of the vehicle at the time of initial manufacture thereof, or subsequently as a replacement structure.

Still another object of the invention is to provide a practical and reliable idler arm mount for steering linkage, and one which will be exceedingly effective for the purpose for which it is designed.

These objects are accomplished by means of such structure and relative arrangement of parts as will fully appear by a perusal of the following specification and claims.

In the drawings:

Fig. 1 is a diagrammatic plan view of the steering linkage of an automotive vehicle showing the improved idler arm mount in place.

Fig. 2 is an enlarged fragmentary longitudinal elevation showing the improved idler arm mount; the idler arm being foreshortened.

Fig. 3 is an enlarged fragmentary transverse sectional elevation on line 3—3 of Fig. 2; the view looking rearwardly.

Referring now more particularly to the drawings and to the characters of reference marked thereon, the improved idler arm mount is adapted for use in connection with the steering linkage, indicated generally at 1, of an automotive vehicle which includes a frame, indicated generally at 2; such frame including longitudinal side beams 3 and 4. The front wheels of the automotive vehicle are indicated at 5 and 6.

The steering linkage 1 includes a transversely extending steering arm 7, and tie rods 8 and 9 are swivelly connected, as at 10 and 11, to such steering arm 7 intermediate its ends and at transversely spaced points; said tie rods 8 and 9 extending laterally in opposite directions to steering connection, in the conventional manner, with the front wheels 5 and 6.

The steering arm 7 is pivoted at one end, as at 12, to the free end of the radial lever 13 which is actuated from the steering column gear box 14. At its opposite end the steering arm 7 is pivoted, as at 15, to the depending shank 16 on the forward end of a longitudinally extending idler arm 17; such idler arm 17 extending, lengthwise of the vehicle, generally parallel to the radial lever 13.

The rear end of the idler arm 17 is pivotally supported, for lateral swinging motion, from the side beam 3 by means of an idler arm mount, indicated generally at 18.

The instant invention is directed to the construction of the idler arm mount 18, and which construction is as follows:

A heavy-duty L-shaped bracket, indicated generally at 19, is disposed adjacent the side beam 3, and such bracket includes an upstanding leg 20 rigidly secured by bolts 21 to said side beam 3.

At its lower end the L-shaped bracket 19 includes a horizontal, laterally inwardly projecting plate or foot 22 which supports—on top thereof—an anti-friction bearing, indicated generally at 23.

The bearing 23 includes a rotary inner race 24, a stationary outer race 25, and upper and lower rows of circumferentially spaced ball bearings 26 carried between said races. The bearing 23 is fixedly secured to the horizontal foot 22 by means of a horizontal top plate 27 which rests on the stationary outer race 25; there being a plurality of bolts 28 which extend between and through the foot 22 and top plate 27 at the corners of the latter. In this manner the bearing 23 is effectively clamped between said foot 22 and the top plate 27.

The foot 22 is formed with a central bore 29, and the top plate 27 is formed with a matching central bore 30; said bores being of greater diameter than the outside diameter of the rotary inner race 24, whereby the latter is free to rotate without obstruction.

A bushing 31 is press-fitted into the rotary inner race 24 for turning with the latter, and such bushing is formed, at its upper end, with an integral nut or head 32 which—on its bottom face—abuts the top of the rotary inner race 24.

The bushing 31 is of such length that it depends a short distance below the rotary inner race 24 into the central bore 29.

The idler arm 17 is formed, at its rear end, with an upstanding threaded shank 33. The bushing 31 is formed with a bore 34 opening to the lower end of said bushing, and which bore is tapped; the shank 33 being threaded for its full length into said tapped bore 34 and until an enlarged flange 35 on said shank 33 is in positive abutment with the lower end of the bushing 31.

As shown, the enlarged flange 35 is of lesser diameter than the central bore 29. The nut or head 32 is provided for the purpose of permitting the bushing 31, and the race 24 to which it is fixed, to be rotated by a wrench for the purpose of threadingly engaging the shank 33 in the tapped bore 34, as above described.

With the described mount the idler arm 17 is free to swing laterally in response to movement of the steering arm 7, but loose-play of said idler arm—other than said free swinging motion—is wholly prevented by reason of the particular structure of the described mount.

As the idler arm swings laterally back and forth there can be no loose-play between the shank 33 and the bushing 31, or between the latter and the rotary inner race 24 of the bearing 23; such bearing, while permitting the idler arm to have free lateral play, preventing vertical loose-play of said idler arm or other undesirable motions thereof.

Thus, the present invention provides a mount which effectively stabilizes the rear or frame supported end of the idler arm 17 without limiting or restricting the free lateral motion thereof as the steering arm 17 shifts back and forth transversely of the frame 2.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A mount for pivotally securing one end of an automotive vehicle steering linkage idler arm to a fixed part of the vehicle, the idler arm including a vertical axis shank at said one end; the mount comprising a bracket adapted to be immovably attached to said fixed part, the bracket including a horizontally projecting plate, an anti-friction bearing seated on the plate, said bearing including a stationary outer race and a rotary inner race, another plate engaging the bearing on top thereof, clamping bolts connecting the plates whereby to rigidly secure the stationary race therebetween, the inner race being clear of said plates and free to rotate, a bore in said first named plate, the shank freely projecting through the bore, and a bushing fixed in the inner race; the bushing having a tapped bore, and the shank being threaded into the same.

2. A mount, as in claim 1, including an enlarged flange on the shank normally positively engaged against an end of the bushing by said threading of the shank into the bore thereof; said other plate having a bore therein, and an integral nut on the adjacent end of the bushing turnable in the bore in said other plate.

3. A mount for pivotally securing one end of an automatic steering linkage idler arm to a fixed part of the vehicle, the idler arm including a vertical-axis threaded shank at said one end; the mount comprising a bracket adapted to be immovably secured to said fixed part and including a horizontal projecting plate, a bushing immovably threaded onto the shank, the bracket plate being bored to receive the bushing therethrough in clearance relation, an anti-friction bearing comprising inner and outer races, the inner race being rigidly fitted on the bushing and the outer race bearing on the plate, and means clamping said outer race against movement relative to the plate.

References Cited in the file of this patent

UNITED STATES PATENTS

| | | |
|---|---|---|
| 1,848,569 | Leggett | Mar. 8, 1932 |
| 1,905,540 | Whitehouse | Apr. 25, 1933 |
| 2,170,455 | Leighton | Aug. 22, 1939 |
| 2,251,936 | Heftler | Aug. 12, 1941 |
| 2,729,043 | Frank | Jan. 3, 1946 |
| 2,467,437 | Martinec | Apr. 19, 1949 |
| 2,642,318 | Ricks | June 16, 1953 |